United States Patent [19]

Hirazawa

[11] Patent Number: 5,009,404
[45] Date of Patent: Apr. 23, 1991

[54] FLUID-FILLED ELASTIC MOUNT

[75] Inventor: Nobuhiro Hirazawa, Inuyama, Japan

[73] Assignee: Tokai Rubber Industries, Ltd., Aichi, Japan

[21] Appl. No.: 371,090

[22] Filed: Jun. 26, 1989

[30] Foreign Application Priority Data

Jul. 2, 1988 [JP] Japan .................. 63-88081[U]

[51] Int. Cl.⁵ ............................. F16M 5/00
[52] U.S. Cl. ................... 267/140.1; 248/562; 267/219
[58] Field of Search ............... 267/146.1 A, 146.1 R, 267/146.1 AB, 141, 141.1, 141.2, 141.3, 141.4, 141.5, 219, 294, 35; 248/562, 636

[56] References Cited

U.S. PATENT DOCUMENTS

| | | | |
|---|---|---|---|
| 2,598,762 | 6/1952 | Dath | 267/294 |
| 4,383,679 | 5/1983 | Kakimoto | 267/140.1 X |
| 4,418,897 | 12/1983 | Härtel et al. | 188/280 |
| 4,657,227 | 4/1987 | Hoffmann | 267/219 |
| 4,664,363 | 5/1987 | Gold et al. | 267/140.1 |
| 4,753,422 | 6/1988 | Thorn | 248/562 X |
| 4,787,610 | 11/1988 | Kojima et al. | 267/140.1 |
| 4,836,512 | 6/1989 | Lun | 248/562 |

FOREIGN PATENT DOCUMENTS

3019337A1 11/1981 Fed. Rep. of Germany .
0084430 4/1986 Japan .................. 267/140.1

Primary Examiner—Matthew C. Graham
Attorney, Agent, or Firm—Oliff & Berridge

[57] ABSTRACT

A fluid-filled elastic mount including a first and a second support member; an elastic body for elastically connecting the first and second support members; a pressure-receiving chamber filled with a non-compressible fluid and receiving a vibrational load applied to the mount; an equilibrium chamber filled with the fluid, at least partially defined by a flexible diaphragm and having a variable volume; a restricted passage for fluid communication between the two chambers; and a movable member movable by a predetermined distance between the two chambers so as to absorb a fluid-pressure difference between the two chambers. The movable member is formed of a rigid material and the restricted passage is provided in the movable member. The elastic mount further includes a holding device fixedly supported by the second support member, for holding an outer peripheral portion of the movable member such that the movements of the movable member are limited by contacts of the outer peripheral portion of the movable member with the holding device; and a cushioning member disposed between the holding device and the outer peripheral portion of the movable member.

9 Claims, 2 Drawing Sheets

FLUID-FILLED ELASTIC MOUNT

BACKGROUND OF THE INVENTION

1. Field of the Invention

The present invention relates in general to a fluid-filled elastic mount which is capable of damping input vibrations based on flows of the fluid enclosed therein, and in particular to such a fluid-filled elastic mount which exhibits improved vibration-damping characteristics for vibrations in a comparatively high frequency range.

2. Discussion of the Prior Art

A mounting member such as an automotive engine mount is generally required to exhibit an excellent vibration-damping effect against input vibrations in a wide frequency range, particularly excellent vibration-damping characteristic against low-frequency large-amplitude vibrations and a sufficiently low dynamic spring constant or rate with respect to high-frequency small-amplitude vibrations.

In the light of the above requirements, there has been recently proposed a fluid-filled elastic mount of a type as disclosed in German Laid-Open Patent Application DE 30 19 337 Al. This fluid-filled elastic mount includes: (a) a first and a second support member which are spaced apart from each other in a load-receiving direction in which a vibrational load is applied to the elastic mount, (b) an elastic body for elastically connecting the first and second support members, (c) means for defining a pressure-receiving chamber between the first and second support members, the pressure-receiving chamber being filled with a non-compressible fluid and receiving the vibrational load applied to the elastic mount, (d) means for defining an equilibrium chamber between the first and second support members, the equilibrium chamber being filled with the non-compressible fluid, at least partially defined by a flexible diaphragm and having a variable volume, (e) means for defining a restricted passage for fluid communication between the pressure-receiving and equilibrium chambers, and (f) a movable member disposed between the pressure-receiving and equilibrium chambers such that the movable member is movable by a predetermined distance in the load-receiving direction so as to absorb a fluid-pressure difference between the pressure-receiving and equilibrium chambers.

The fluid-filled elastic mount of the type described above had been developed based on the knowledge that low-frequency vibrations have large amplitudes, for which an elastic mount is required to exhibit excellent vibration-damping characteristic, while high-frequency vibrations have small amplitudes, for which an elastic mount is required to exhibit a sufficiently low dynamic spring constant. Upon application of low-frequency large-amplitude vibrations to the known elastic mount, the movements of the movable member in the load-receiving direction cannot accommodate or absorb a change in the fluid pressure of the pressure-receiving chamber, on the other hand the restricted passage (i.e., orifice) properly serves or operates to permit the fluid to flow therethrough so as to absorb the fluid-pressure change and thereby damp the input vibrations. This vibration-damping characteristic is proper to the orifice. Meanwhile, upon application of high-frequency small-amplitude vibrations, the movements of the movable member result in substantial fluid flows between the pressure-receiving and equilibrium chambers, thereby preventing an increase in the fluid pressure of the pressure-receiving chamber, namely avoiding an increase in the dynamic spring constant of the elastic mount due to a substantially closed condition of the orifice. Consequently the elastic mount exhibits a lowered dynamic spring constant for the input vibrations.

In the above fluid-filled elastic mount, it is preferred that the orifice have a sufficiently large cross-sectional area for the fluid flows therethrough and a sufficient length for the fluid flows therealong, to provide excellent damping characteristic for vibrations in a comparatively low frequency range. The above-indicated German Patent Application teaches forming the orifice in an outer peripheral portion of a partition member which separates the pressure-receiving and equilibrium chambers from each other, such that the orifice extends in the circumferential direction of the partition member. Meanwhile, the above-indicated movable member is movably supported by an inner or central portion of the partition member which is surrounded by the orifice.

In the above fluid-filled elastic mount, however, the effective area of the movable member, that is, cross-sectional area surrounded by the central portion of the partition member which area is effective to displace the fluids in the pressure-receiving and equilibrium chambers based on the movements of the movable member, is limited to a considerably small region because of the provision of the orifice. Consequently, the inner or central portion of the partition member defining the above-indicated cross-sectional area, is placed in an unoperable condition as if it is closed, upon application of vibrations in a relatively low frequency range, whereby the movable member is not capable of providing a satisfactory, fluid pressure change-absorbing effect for vibrations in a relatively high frequency range.

SUMMARY OF THE INVENTION

It is therefore an object of the present invention to provide a fluid-filled elastic mount which is capable of exhibiting excellent vibration-damping characteristics for low-frequency large-amplitude vibrations based on the fluid flows through the orifice, and exhibiting excellent vibration-isolating characteristics or a sufficiently low dynamic spring constant with respect to high-frequency small-amplitude vibrations based on the movements of the movable member, i.e., fluid pressure change-absorbing effect of the same.

The above object has been achieved by the principle of the present invention, which provides a fluid-filled elastic mount including (a) a first and a second support member which are spaced apart from each other in a load-receiving direction in which a vibrational load is applied to the elastic mount, (b) an elastic body for elastically connecting the first and second support members, (c) means for defining a pressure-receiving chamber between the first and second support members, the pressure-receiving chamber being filled with a non-compressible fluid and receiving the vibrational load applied to the elastic mount, (d) means for defining an equilibrium chamber between the first and second support members, the equilibrium chamber being filled with the non-compressible fluid, at least partially defined by a flexible diaphragm, and having a variable volume, (e) means for defining a restricted passage for fluid communication between the pressure-receiving chamber and the equilibrium chamber, and (f) a movable member disposed between the pressure-receiving chamber and the equilibrium chamber such that the movable member is movable by a predetermined distance in the load-receiving direction so as to absorb a fluid-pressure difference between the pressure-receiving chamber and the equilibrium chamber, wherein the improvements comprise: (1) the movable member being formed of a rigid material and supporting the means for defining the restricted passage, (2) holding means fixedly supported by the second support member, for holding an outer peripheral portion of the movable member such that the movements of the movable member in the load-receiving direction are limited by contacts of the outer peripheral portion of the movable member with the holding means, and (3) cushioning means disposed between the holding means and the outer peripheral portion of the movable member.

In the fluid-filled elastic mount of the present invention constructed as described above, the means for defining the restricted passage (i.e., orifice) is supported by the movable member, which is displaceably held at the outer peripheral portion thereof by the holding means. Accordingly, the cross-sectional area for the substantial fluid flows between the pressure-receiving and equilibrium chambers due to the movements of the movable member (hereinafter, referred to as "fluid-flow area" when appropriate), is not limited by the provision of the orifice, in contrast to the known elastic mount disclosed by the previously-indicated German Patent Application. The inner peripheral portion of the holding means which defines the above-indicated fluid-flow area, is not placed in a closed condition upon application of relatively low frequency vibrations to the elastic mount. Thus, the movable member provides the effect of absorbing a difference between the fluid pressures in the pressure-receiving and equilibrium chambers. Therefore, the instant elastic mount exhibits excellent vibration-damping characteristics, i.e., a sufficiently low dynamic spring constant against vibrations in a wide frequency range including vibrations in a comparatively high frequency range.

In addition, since the cushioning means is provided between the outer peripheral portion of the movable member, and the holding means which displaceably holds the outer peripheral portion of the movable member, the outer peripheral portion of the movable member and the holding means indirectly contact each other via the cushioning means, thereby avoiding shocks otherwise produced by direct contact between the two pieces upon application of vibrations and thereby preventing or attenuating rattling noises and/or vibrations resulting from the contacts.

According to a feature of the present invention, the outer peripheral portion of the movable member has a pair of contact surfaces, the cushioning means comprising a pair of cushioning members each of which is secured to a corresponding one of the pair of contact surfaces such that the each cushioning member having a predetermined height as measured from the corresponding contact surface in the load-receiving direction, the pair of contact surfaces being subjected to shock-absorbing butting contacts with the holding means via the pair of cushioning members. In this case, the outer peripheral portion of the movable member may consist of an outer annular flange extending outwardly from the movable member, and each of the pair of cushioning members may be secured to a corresponding one of opposite surfaces of the outer annular flange. Also, each of the cushioning members may include an annular lip formed integral therewith. Further, the cushioning members may be formed of rubber.

According to another feature of the present invention, the holding means fixedly supported by the second support member, consists of a first and a second generally annular member, the first annular member including an inner flanged portion having a generally L-shaped cross section while the second annular member includes an inner planar portion, the generally L-shaped inner flanged portion of the first annular member and the inner planar portion of the second annular member cooperate with each other to define an annular groove, and the peripheral portion of the movable member is held in the annular groove and is subjected to contacts via the cushioning means with inner surfaces of the generally L-shaped inner flanged portion and the inner planar portion which define the annular groove.

According to yet another feature of the present invention, the movable member consists of a first generally cylindrical member having the outer peripheral portion, and a second generally cylindrical member having a helical groove formed in an outer circumferential surface thereof, the second cylindrical member is fitted in the first cylindrical member such that the helical groove is closed by an inner circumferential surface of the first cylindrical member so as to provide the restricted passage which communicates between the pressure-receiving and equilibrium chambers, the outer peripheral portion of the movable member consisting of an outer annular flange extending radially outwardly of the first cylindrical member.

According to a further feature of the invention, the second support member comprises a base member which is attached at a central portion thereof to a body of an automotive vehicle, and a calking member which is calked against an outer flanged portion of the base member, an outer peripheral portion of the flexible diaphragm, outer peripheral portions of the first and second annular members of the holding means and a portion of the elastic body being held under pressure between the base member and the calking member calked against the base member.

According to a still further feature of the invention, the fluid-filled elastic mount further comprises at least one restrictor member which is at least partially embedded in the elastic body, the at least one restrictor member having a generally annular shape.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
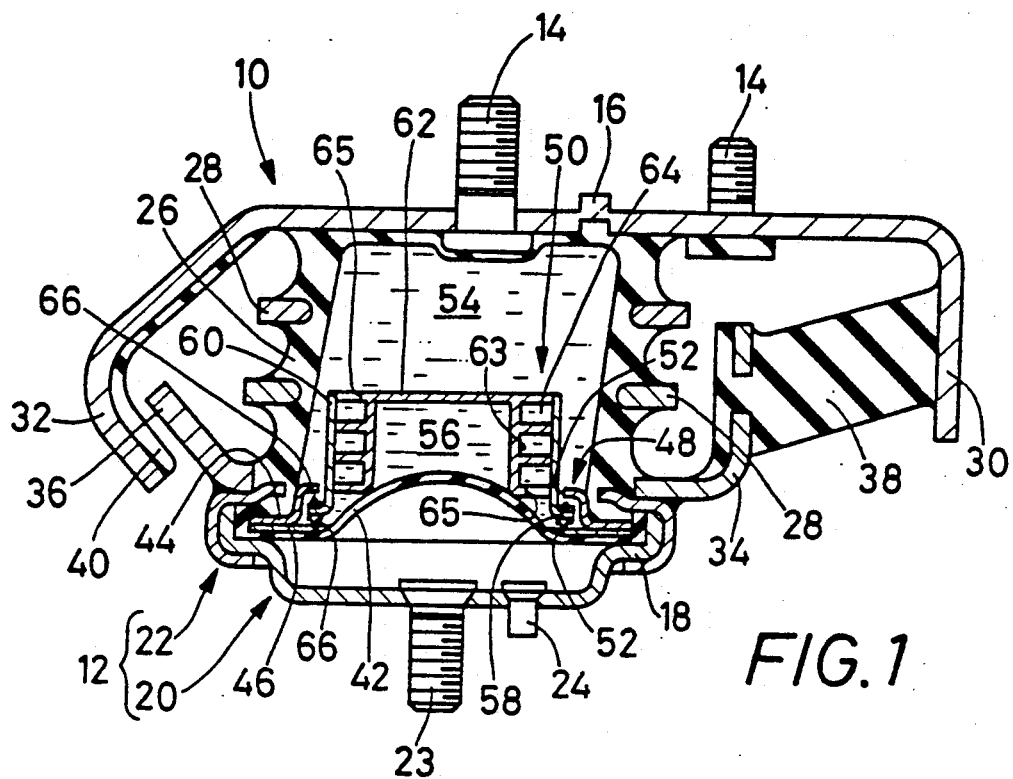
FIG. 1 is an elevational view in vertical cross section of one embodiment of a fluid-filled elastic mount of the present invention in the form of an engine mount.
Figure 2:
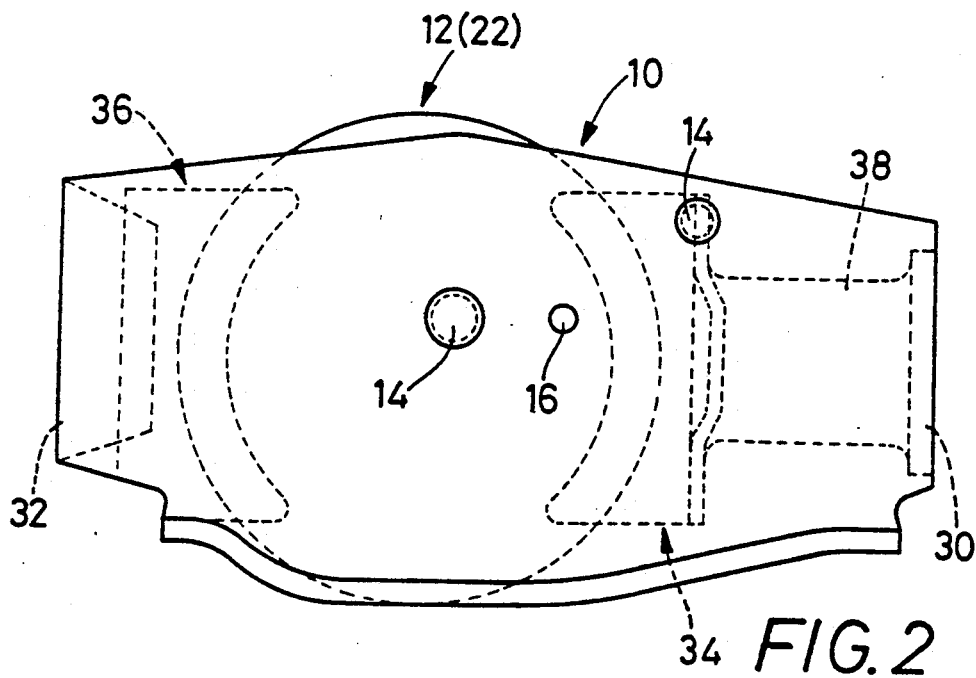
FIG. 2 is a plan view of the engine mount of FIG. 1.

Referring first to FIGS. 1 and 2 there is shown a fluid-filled elastic mount in the form of an engine mount used for mouting an engine unit on the body of a motor vehicle. In the figures, reference numerals 10 and 12 denote a first and a second support member which are formed of a metallic material. These first and second support members 10, 12 are spaced apart from each other by a suitable distance in a direction in which a vibrational load is applied to the instant engine mount, i.e., in the top-bottom direction of FIG. 1. This direction will be referred to as "load-receiving direction" when appropriate.

The first support member 10 has a generally planar configuration. Mounting bolts 14, 14 are secured to the outer surface of the first support member 10 such that the bolts 14 extends outwardly of the engine mount in the load-receiving direction. The second support member 12 consists of a generally cylindrical base member 20 including a central bottom portion and an outer peripheral flanged portion 18, and an annular calking member 22 calked against the open end, i.e., outer peripheral flanged portion 18 of the base member 20. A mounting bolt 23 is secured to a central portion of the outer surface of the base member 20 such that the bolt 23 extends outwardly of the engine mount in the load-receiving direction. Reference numerals 16 and 24 designate positioning projections according to which the instant mount is installed in place for flexibly mounting the engine unit on the vehicle body.

The first and second support members 10, 12 are elastically connected to each other by an elastic body 26 of rubber, such that the open end of the second support member 12 is positioned on the side of the first support member 10. The elastic body 26 has a generally cylindrical shape with a bottom wall, and is vulcanized at the bottom end thereof to the first support member 10 and at the open end thereof to the calking member 22 of the second support member 20. Thus, the first and second support members 10, 12 are fixed to the elastic body 26 in a fluid-filled manner. A pair of annular restrictor members 28, 28 of metal are embedded in the outer circumferential surface of an axially intermediate portion of the elastic body 26.

The instant engine mount is installed on the motor vehicle such that the first support member 10 is attached to a member or part on the side of the engine unit via the mounting bolts 14, while the second support member 12 is attached via the mounting bolt 23 to a member or part on the side of the vehicle body, and that an axis of the engine mount is inclined by a predetermined angle with respect to the load-receiving direction, i.e., the top-bottom direction of FIG. 1. Thus, the engine mount damps vibrations transmitted from or to the engine unit to or from the vehicle body.

A pair of first and second stopper portions 30, 32 extend from the first support member 10 in opposite directions perpendicular to the load-receiving direction. The first stopper portion 30 includes a planar, vertically downwardly extending tongue, while the second stopper portion 32 includes a generally downwardly extending tongue with a generally L-shaped cross section. A pair of first and second mating members 34, 36 are fixed by welding to the calking member 22 of the second support member 12 such that the first and second mating members 34, 36 are opposed to the first and second stopper portions 30, 32, respectively, at respective suitable distances therefrom. A pair of first and second rubber members 38, 40 are disposed between the first and second stopper portions 30, 32 and the first and second mating members 34, 46, respectively. More specifically described, the first rubber member 38 is vulcanized to the first stopper portion 30 and the first mating member 34, while the second rubber member 40 is vulcanized to the inner surface of the second stopper portion 32 which faces the second mating member 36. The portions and members 30, 32, 34, 36, 38, 40 cooperate with each other to serve as stopper means for preventing the first and second support members 10, 12 from being excessively largely displaced relative to each other in the load-receiving direction.

A flexible diaphragm 42 formed of rubber is fixedly supported by the second support member 12 such that the outer peripheral portion of the diaphragm 42 is held in a fluid-tight manner between the base member 20 and calking member 22 of the second support member 12. The flexible diaphragm 42 closes the open end of the elastic body 26 so as to define a fluid-tight enclosure filled with a suitable non-compressible fluid such as water, alkylene glycol, polyalkylene glycol and silicone oil.

Also, a first and a second holding member 44, 46 of metal are fixedly supported by the second support member 12. The first and second holding members 44, 46, which have an annular, plate-like configuration, are disposed in tandem in the load-receiving direction, such that the outer peripheral portions of the holding members 44, 46 are sandwiched under pressure, together with the outer peripheral portion of the flexible diaphragm 42 and a portion of the elastic body 26, between the base member 20 and the calking member 22 calked against the base member 20, and that inner peripheral portions 45, 47 of the holding members 44, 46 are exposed over a suitable radial length thereof in the fluid-tight enclosure filled with the non-compressible fluid. The inner peripheral portion 45 of the first holding member 44 is flanged so as to have a generally L-shaped cross section, while the inner peripheral portion 47 of the second holding member 46 has a planar configuration. The inner flanged portion 45 of the first holding member 44 and the inner planar portion 47 of the second holding member 46 are opposed to each other with a suitable distance therebetween in the load-receiving direction, and cooperate with each other to define an annular groove 49 opening radially inwardly of the second support member 12. The annular holding members 44, 46 have inner communication holes 52, 52 defined by the corresponding inner peripheral portions 45, 47 thereof. Thus, the pair of first and second holding members 44, 46 serve as holding means 48 for movably or displaceably holding a movable member 50 described below in detail, in the fluid-tight enclosure filled with the non-compressible fluid.

The movable member 50 is formed of a rigid material and has a generally cylindrical configuration with a bottom. The communication holes 52 of the holding means 48 are closed by the movable member 50. Thus, the fluid-tight enclosure is divided into a pressure-receiving chamber 54 on the side of the elastic body 26 (or the first support member 10), and an equilibrium chamber 56 on the side of the flexible diaphragm 42 (or the second support member 12). Upon application of a vibrational load to the instant engine mount, the pressure-receiving chamber 54 receives the vibrational load through elastic deformation of the elastic body 26, and the fluid pressure in the pressure-receiving chamber 54 is changed. Meanwhile, the equilibrium chamber 56 is partially defined by the flexible diaphragm 42, and therefore has a variable volume filled with the non-compressible fluid. Upon input of a vibrational load to the engine mount, the flexible diaphragm 42 is deformed due to a change in the fluid pressure of the equilibrium chamber 56, whereby the volume of the equilibrium chamber 56 is changed. Accordingly, substantially no change will take place in the fluid pressure of the equilibrium chamber 56.

The movable member 50 consists of an outer generally cylindrical member 60 and an inner generally cylindrical member 62 which are formed of metal. The outer cylindrical member 60 has an outer annular flange 58 extending radially outwardly from one of opposite open ends thereof. Meanwhile, the inner cylindrical member 62 is fitted in the outer cylindrical member 60 such that the bottom wall of the inner cylindrical member 62 closes the other open end of the outer cylindrical member 60, so as to provide the bottom of the movable member 50.

The inner cylindrical member 62 of the movable member 50 has a helical groove 63 formed in the outer circumferential surface of the cylindrical body thereof and extending in the circumferential direction thereof. With the inner cylindrical member 62 fitted in the outer cylindrical member 60, the helical groove 63 opening in the outer circumferential surface of the inner cylindrical member 62 is closed by the inner circumferential surface of the outer cylindrical member 60, so as to provide an orifice 64 which communicates, via ports 65, 65 at both ends of the helical groove 63, with the pressure-receiving chamber 54 and the equilibrium chamber 56, respectively. The dimensions of the orifice 64, such as a circumferential length and a cross-sectional area of flow, are so determined as to suitably damp vibrations in a comparatively low frequency range, such as engine shake. That is, the input vibrations are damped based on a predetermined resistance to the fluid flows through the orifice 64, or based on resonance of the fluid masses existing in the orifice 64.

The outer annular flange 58 of the movable member 50 is fitted in the annular groove 49 of the holding means 48, with suitable clearances or loosenesses left therebetween in the load-receiving direction, so that the movable member 50 is movable by a predetermined distance in the load-receiving direction. Thus, the movements of the movable member 50 in the load-receiving direction are limited by butting contacts of the opposite surfaces of the annular flange 58 with the inner surfaces of the inner flanged portion 45 and inner planar portion 47 defining the annular groove 49. In other words, the movable member 50 is displaceable by the predetermined distance in the load-receiving direction in the communication holes 52 between the pressure-receiving and equilibrium chambers 54.

Upon application of a vibrational load to the instant engine mount, the movable member 50 is displaced in the communication holes 52, so as to absorb a difference between the fluid pressures of the pressure-receiving and equilibrium chambers 54, 56. Thus, substantial fluid flows are caused between the pressure-receiving and equilibrium chamber 54, 56 due to the displacements of the movable member 50 in the communication holes 52. Therefore, changes in the fluid pressure of the pressure-receiving chamber 54 upon application of vibrations to the engine mount are absorbed by the fluid flows due to the displacements of the movable member 50 in the communication holes 52.

Figure 3:
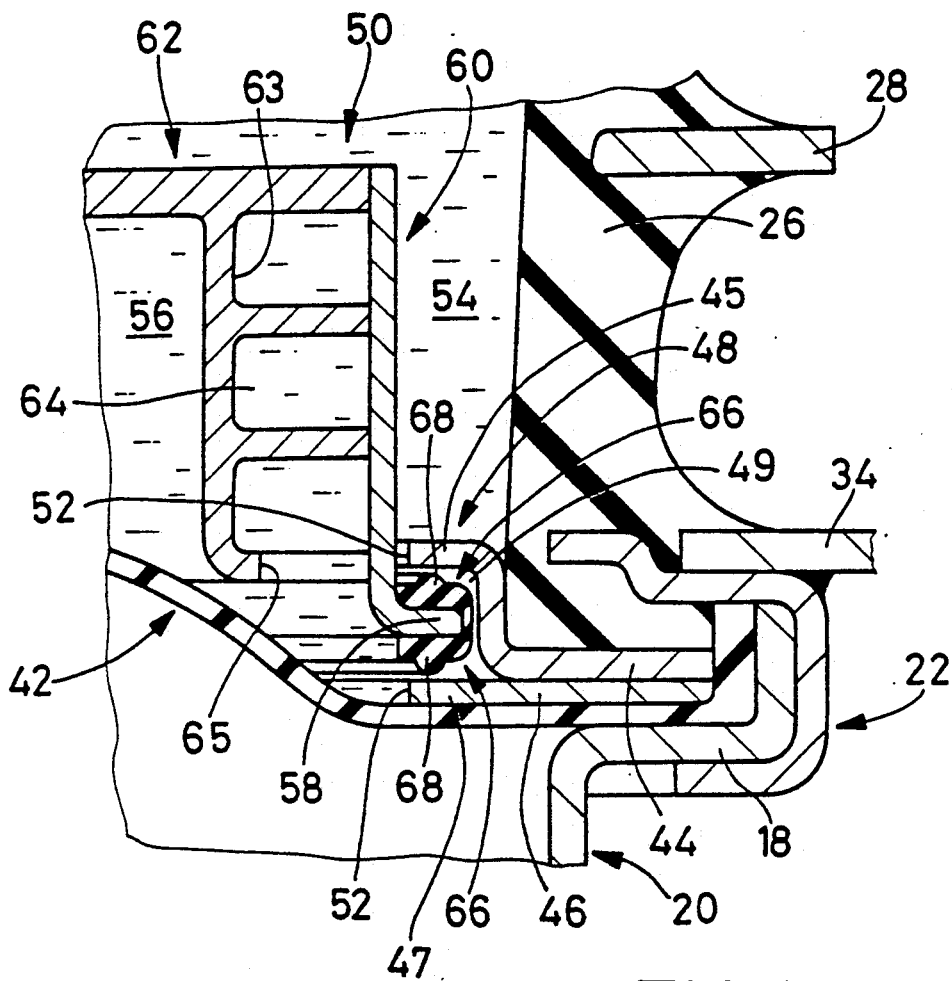
FIG. 3 is an enlarged fragmentary view in vertical cross section partially illustrating the engine mount of FIG. 1.

As shown in FIG. 3, the outer annular flange 58 of the movable member 50 is provided on opposite surfaces thereof with a pair of annular cushioning members 66, 66 formed of rubber with a suitable thickness. Upon application of vibrations to the engine mount, the annular flange 58 is subjected to shock-absorbing butting contacts with the inner surfaces of the annular groove 49 of the holding means 48 via the cushioning members 66. In the present embodiment, each cushioning member 66 has an annular lip 68 formed integral therewith on the butting surface thereof and extending in the circumferential direction thereof. The annular lips 68, 68 serve to more suitably absorb shocks produced by the butting contacts of the annular flange 58 with the holding means 48.

In the engine mount constructed as described above, upon application of low-frequency large-amplitude vibrations thereto, the displacements of the movable member 50 cannot absorb changes in the fluid pressure in the pressure-receiving chamber 54, and the orifice 64 properly operates to permit the fluid flows therethrough, so that the engine mount exhibits excellent vibration-damping characteristics against such vibrations. Meanwhile, upon exertion of intermediate- or high-frequency low-amplitude vibrations to the engine mount, at which the orifice 64 is substantially closed, the displacements of the movable member 50 effectively absorb changes in the fluid pressure of the pressure-receiving chamber 54, so that the engine mount exhibits a sufficiently lowered dynamic spring constant for such vibrations.

In the instant engine mount, since the orifice 64 is provided in the movable member 50, the communication holes 52 have a larger fluid-flow area, i.e., cross-sectional area for the substantial fluid flows between the pressure-receiving and equilibrium chambers 54, 56 due to the displacements of the movable member 50, than in the previously-described known elastic mount. Thus, the instant engine mount is free from the problem that the above-indicated fluid-flow area is limited to a considerable small area because of the provision of a member or part defining the orifice, which problem has been encountered in the prior art. Accordingly, the communication holes 52 are so dimensioned as to effectively isolate vibrations in a comparatively high frequency range based on resonance of the fluid masses therein. The communication holes 52 are not placed in an unoperable condition as if it is closed, upon application of vibrations in a relatively low frequency range, in contrast to the known elastic mount. Consequently the instant engine mount exhibits a sufficiently low dynamic spring constant effective to damp vibrations in a wide frequency range including a comparatively high range.

The resonance frequency of the fluid masses flowing through the communication holes 52, due to the displacements of the movable member 50, is varied depending upon the mass of the movable member 50 acting as a vibrator. As the mass of the movable member 50 is lowered, the resonance frequency of the above fluid masses is raised, that is, higher frequency vibrations are isolated based on the resonance of the fluid masses.

The movable member 50 is required to have a certain degree of rigidity, because the movable member 50 serves to separate the pressure-receiving and equilibrium chambers 54, 56 from each other and is held at the outer annular flange 58 thereof by the pair of holding members 44, 46 (holding means 48). Therefore, it is necessary to prevent the rigid movable member 50 (specifically, annular outer flange 58) from directly colliding with the metallic holding members 44, 46, and thereby prevent rattling noises and/or vibrations resulting from such collisions. To this end the opposite surfaces of the outer annular flange 58 are provided with the cushioning members 66, 66 which serve to suitably absorb impacts produced upon butting contacts of the annular flange 58 with the holding means 48, thereby effectively preventing or attenuating abnormal noises and/or vibrations resulting from such impacts.

Since in the illustrated embodiment the cushioning members 66, 66 are formed to have the annular lips 68, 68 respectively, the cushioning members 66, 66 exhibit a more excellent shock-absorbing effect upon the butting contacts of the annular flange 58 with the holding means 48.

Further, since the orifice 64 is provided in the radially outer portion of the generally cylindrical movable member 50, the orifice 64 has a sufficient circumferential length, so that the engine mount exhibits excellent vibration-damping characteristics for vibrations in a comparatively low frequency range.

In the case where the orifice 64 is constituted by the helical groove 63, as in the illustrated embodiment, the length of the orifice 64 has a higher degree of freedom. Thus, the instant engine mount exhibits improved vibration-damping characteristic for vibrations in a comparatively low frequency range, in addition to its sufficiently low dynamic spring constant for vibrations in a wide frequency range including a comparatively high frequency range.

While the presently preferred embodiment of the invention has been described with particularities for illustrative purposes only, it is to be understood that the invention is by no means limited to the details of the embodiment, but may be otherwise embodied.

For example, while in the illustrated embodiment the helical orifice 64 is formed in the radially outer portion of the cylindrical movable member 50, it is possible to form an orifice (64) in the mating surfaces of a pair of rigid plate-like members which are superposed on each other in the load-receiving direction of the engine mount.

Further, the illustrated arrangement of the holding means 48 (first and second holding members 44, 46) with respect to the outer annular flange 58 of the movable member 50, for movably holding the movable member 50, may be replaced by another arrangement in which the second support member 12 securely supports an annular holding member and the annular holding member is loosely fitted between a pair of outer annular flanges of the movable member 50 which are spaced apart from each other in the load-receiving direction. In this case, too, the movable member 50 is displaceable in the load-receiving direction by a predetermined distance, which is defined by the pair of outer annular flanges of the movable member 50 with which the opposite surfaces of the annular holding member are subjected to butting contacts upon application of vibrations to the engine mount. Alternatively, it is possible to movably hold the outer annular flange 58 of the movable member 50 by and between the base member 20 and calking member 22 of the second support member 12, in place of the pair of first and second holding members 44, 46.

Also, the annular lips 68, 68 formed on the butting surfaces of the cushioning members 66, 66 may be omitted. It is possible that the cushioning members 66 have a sufficiently low spring constant and accordingly those cushioning members 66 exhibit a high cushioning effect comparable with that of the annular lips 68. Further, it is possible to use cushioning members 66, 66 having a configuration similar to that of the annular lips 68, 68.

Moreover, it is possible to place the cushioning members 66 secured to the opposite surfaces of the annular flange 58, under pressure between the opposite surfaces of the annular flange 58 and the inner surfaces of the first and second holding members 44, 46 defining the annular groove 49, respectively, namely without any clearances or loosenesses left between the cushioning members 66, and the opposite surfaces of the annular flange 58 or the inner surfaces of the holding members 44, 46. In this case, the elastic deformation (compression) of the cushioning members 66 permits the movable member 50 to be displaced by a suitable distance in the load-receiving direction of the engine mount. The displacements of the movable member 50 in the load-receiving direction are limited by the indirect contacts of the annular flange 58 with the holding members 44, 46 via the elastic members 66.

Furthermore, while the present invention has been described in the embodiment in the form of the automotive engine mount, the principle of the invention may be applied to various other mounting members such as those used in vibration-generating machines.

It is to be understood that the present invention may be embodied with various other changes, modifications and improvements that may occur to those skilled in the art without departing from the scope and spirit of the invention defined in the appended claims.

What is claimed is:

1. A fluid-filled elastic mount comprising:
a first and second support member which are spaced apart from each other in a load-receiving direction in which a vibrational load is applied to the elastic mount;
an elastic body for elastically connecting said first and second support members;
means for defining a pressure-receiving chamber between said first and second support members, said pressure-receiving chamber being filled with a non-compressible fluid and receiving said vibrational load applied to the elastic mount;
means for defining an equilibrium chamber between said first and second support members, said equilibrium chamber being filled with said non-compressible fluid, at least partially defined by a flexible diaphragm, and having a variable volume;
means for defining a restricted passage for fluid communication between said pressure-receiving chamber and said equilibrium chamber;
a movable member disposed between said pressure-receiving chamber and said equilibrium chamber such that said movable member is movable by a predetermined distance in said load-receiving direction so as to absorb a fluid-pressure difference between the pressure-receiving chamber and the equilibrium chamber, said movable member being formed of a rigid material and supporting said means for defining said restricted passage;
holding means fixedly supported by said second support member for holding an outer peripheral portion of said movable member such that the movements of said movable member in said load-receiving direction are limited by butting contacts of said outer peripheral portion of said movable member with said holding means; and cushioning means disposed between holding means and said outer peripheral portion of said movable member, said outer peripheral portion being subjected to the contacts with said holding means via said cushioning members, wherein said movable member comprises a first generally cylindrical member having said outer peripheral portion, while said means for defining said restricted passage comprises a second generally cylindrical member having a helical groove formed in an outer circumferential surface thereof, said second cylindrical member being fitted in said first cylindrical member so that said restricted passage is provided by said helical groove closed by an inner circumferential surface of said first cylindrical member.

2. The fluid-filled elastic mount as set forth in claim 1, wherein said outer peripheral portion of said movable member has a pair of contact surfaces, said cushioning means comprising a pair of cushioning members each of which is secured to a corresponding one of said pair of contact surfaces such that said each cushioning member has a predetermined height as measured from said corresponding contact surface in said load-receiving direction, said pair of contact surfaces being subjected to shock-absorbing butting contacts with said holding means via said pair of cushioning members.

3. The fluid-filled elastic mount as set forth in claim 2, wherein said outer peripheral portion of said movable member consists of an outer annular flange extending outwardly from the movable member, each of said pair of cushioning members being secured to a corresponding one of opposite surfaces of said outer annular flange.

4. The fluid-filled elastic mount as set forth in claim 2, wherein each of said cushioning members has an annular lip formed integral therewith.

5. The fluid-filled elastic mount as set forth in claim 2, wherein said cushioning members are formed of rubber.

6. The fluid-filled elastic mount as set forth in claim 1, wherein said holding means fixedly supported by said second support member, consists of a first and a second generally annular member, said first annular member including an inner flanged portion having a generally L-shaped cross section while said second annular member including an inner planar portion, said generally L-shaped inner flanged portion of said first annular member and said inner planar portion of said second annular member cooperating with each other to define an annular groove, said outer peripheral portion of said movable member being held in said annular groove and subjected to contacts via said cushioning means with inner surfaces of said generally L-shaped inner flanged portion and said inner planar portion which define said annular groove.

7. The fluid-filled elastic mount as set forth in claim 1, wherein said outer peripheral portion of said movable member comprises an outer annular flange extending radially outwardly of said first cylindrical member.

8. The fluid-filled elastic mount as set forth in claim 1, wherein said second support member comprises a base member which is attached at a central portion thereof to a body of an automotive vehicle, and a calking member which is calked against an outer flanged portion of said base member, an outer peripheral portion of said flexible diaphragm, outer peripheral portions of said first and second annular members of said holding means and a portion of said elastic body being held under pressure between said base member and said calking member calked against said base member.

9. The fluid-filled elastic mount as set forth in claim 1, further comprising at least one restrictor member which is at least partially embedded in said elastic body, said at least one restrictor member having a generally annular shape.

* * * * *